United States Patent [19]
Dretzka

[11] Patent Number: 5,590,968
[45] Date of Patent: Jan. 7, 1997

[54] BEARING RETAINER ASSEMBLY

[75] Inventor: Andrew P. Dretzka, Cudahy, Wis.

[73] Assignee: Harnischfeger Corporation, Brookfield, Wis.

[21] Appl. No.: 529,320

[22] Filed: Sep. 18, 1995

[51] Int. Cl.⁶ ..................................................... F16C 19/36
[52] U.S. Cl. ........................... 384/563; 384/272; 384/570
[58] Field of Search ....................................... 384/563, 272, 384/570, 571, 582, 517

[56] References Cited

U.S. PATENT DOCUMENTS

| | | | |
|---|---|---|---|
| 4,023,868 | 5/1977 | Miki | 384/563 |
| 4,641,558 | 2/1987 | Hoffmann | 384/563 |
| 4,780,001 | 10/1988 | Werner | 384/563 |
| 5,234,100 | 10/1993 | Cook | 384/563 |

*Primary Examiner*—Lenard A. Footland
*Attorney, Agent, or Firm*—Michael, Best & Friedrich

[57] ABSTRACT

Apparatus comprising an inner member having an axis and an axially extending outer surface, an outer member having an axially extending inner surface, the inner and outer members being rotatable relative to each other about the axis, a bearing between the inner and outer surfaces, the bearing having a radially extending bearing surface, and a bearing retainer assembly including a first retainer which engages the bearing surface and which has a first tapered surface, a second retainer having a second tapered surface engaging the first tapered surface, an axially extending retainer surface engaging one of the inner and outer members, and a radially extending retainer surface, each of the first and second tapered surfaces tapering radially away from the one of the inner and outer members and axially away from the bearing, a spring engaging the retainer surface, and a cap which is fixed to the one of the inner and outer members and which engages the spring so that the spring is compressed between the cap and the retainer surface and exerts a force on the retainer surface whereby the second retainer is wedged between the first retainer and the one of the inner and outer members.

19 Claims, 9 Drawing Sheets

BEARING RETAINER ASSEMBLY

BACKGROUND OF THE INVENTION

All bearings (tapered roller, cylindrical, ball, etc.) require some sort of retainer to hold them in place. Typically, the retainer must be very accurately located (especially in multiple bearing applications). This usually means use of adjustable nuts/bolts or a variety of shims under the retainer cap. When nuts/bolts are used, they are typically torqued to a specific value to generate the preload, which is most commonly needed with tapered roller bearings. Torquing bolts for a specific preload is inaccurate as many variables come into play such as thread pitch, lubrication, torque wrench accuracy, etc. When multiple nuts/bolts are used, an uneven loading situation may also occur. The use of shims allows one to obtain a preload or a gap. This provides a means to tightly bolt on the retainer, but the user typically must use a trial and error approach to determine the correct number/thickness of shims. This requires the end cap to be assembled onto the part, the resulting gap measured, and the correct thickness of the shims calculated. This must then be disassembled and reassembled with the shims now in place. A sufficient supply of shims must also be on hand at this time.

Due to the nature of tapered roller bearings and some ball type bearings, a radial load on the bearing will produce a separating force trying to push the bearings apart. If the separation is significant, it can reduce the contact area between the rollers (balls) and the races, severely shortening bearing life. To help combat this, some bearing manufacturers recommend preloading the bearings to help maintain the contact area. This preload typically has a range in which the bearing life remains fairly constant.

Cylindrical bearings and most ball bearings require a gap.

SUMMARY OF THE INVENTION

The invention provides a retainer that uses a spring, preferably a polymer (polyurethane) washer, to preload the bearings. The washer could also be a conical disc or wave type washer depending on the preload needs. The washer is compressed at assembly by bolting on an end cap and pushes against a tapered ring. This ring is split radially so it may conform to the size of either the inner hub or the outer hub. On various embodiments, the inner and/or outer hub may rotate. Another tapered ring is held axially by the bearing and compresses the split ring against the hub. The angle of the taper is calculated such that the compressive lead and friction generated should be greater than the axial separating force of the bearings.

In one embodiment of the invention, the split ring is an inner ring conforming to the inner hub, and the other ring is an outer ring that compresses the split ring against the inner hub. The tapered roller bearings ride about the inner hub and are separated by an internal flange on the outer hub. The inner tapered ring rides partially inside the outer tapered ring which rides against the bearing. The polymer (polyurethane) washer (preload ring) is compressed between the end cap and the inner tapered ring. The compressed preload ring provides the necessary preload on the bearings. In most applications, the radial load on the bearings creates a separating force greater than the preload. With this retainer, the separating force acts on the outer ring. The outer ring has an internal taper, and the inner ring has a matching external taper.

In one embodiment of the invention, it is the clamping force of the two rings along with the backing force of the polyurethane washer that keeps the bearings from separating. In the event the outer ring should slip or break, there is an internal ledge in the end cap which will keep the bearing from fully separating. The end cap also keeps the assembly from completely coming apart. The axial load acting on the rings creates a clamping load between the inner ring and the inner hub, thus keeping the assembly rigid.

In another embodiment of the invention, in such cases as when the clamping force is not enough to hold the rings in place and keep them from sliding relative to the hub, additional screws may be used to clamp the two rings together. This arrangement can also be used when a prescribed gap is desired for the bearings. The preload ring will still apply a preload to the inner and outer rings and the bearings. The screws, however, will draw the outer ring back up onto the inner ring. The value of this can be calculated based on the screw torque, and inner/outer ring geometry. The preload compression minus the amount the outer ring is drawn up onto the inner ring equals the gap. The screws provide for additional clamping of the rings. This can, but does not have to, provide a gap for the bearings.

While the invention is described in connection with a sheave in a dragline, it should be understood that the invention is applicable to bearing assemblies for other applications and for other rotating members, such as rollers or gears, for example.

Other features and advantages of the invention will become apparent to those skilled in the art upon review of the following detailed description, claims and drawings.

DESCRIPTION OF THE DRAWINGS

FIG. 7 is a view taken along line 7—7 in FIG. 5.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 1:
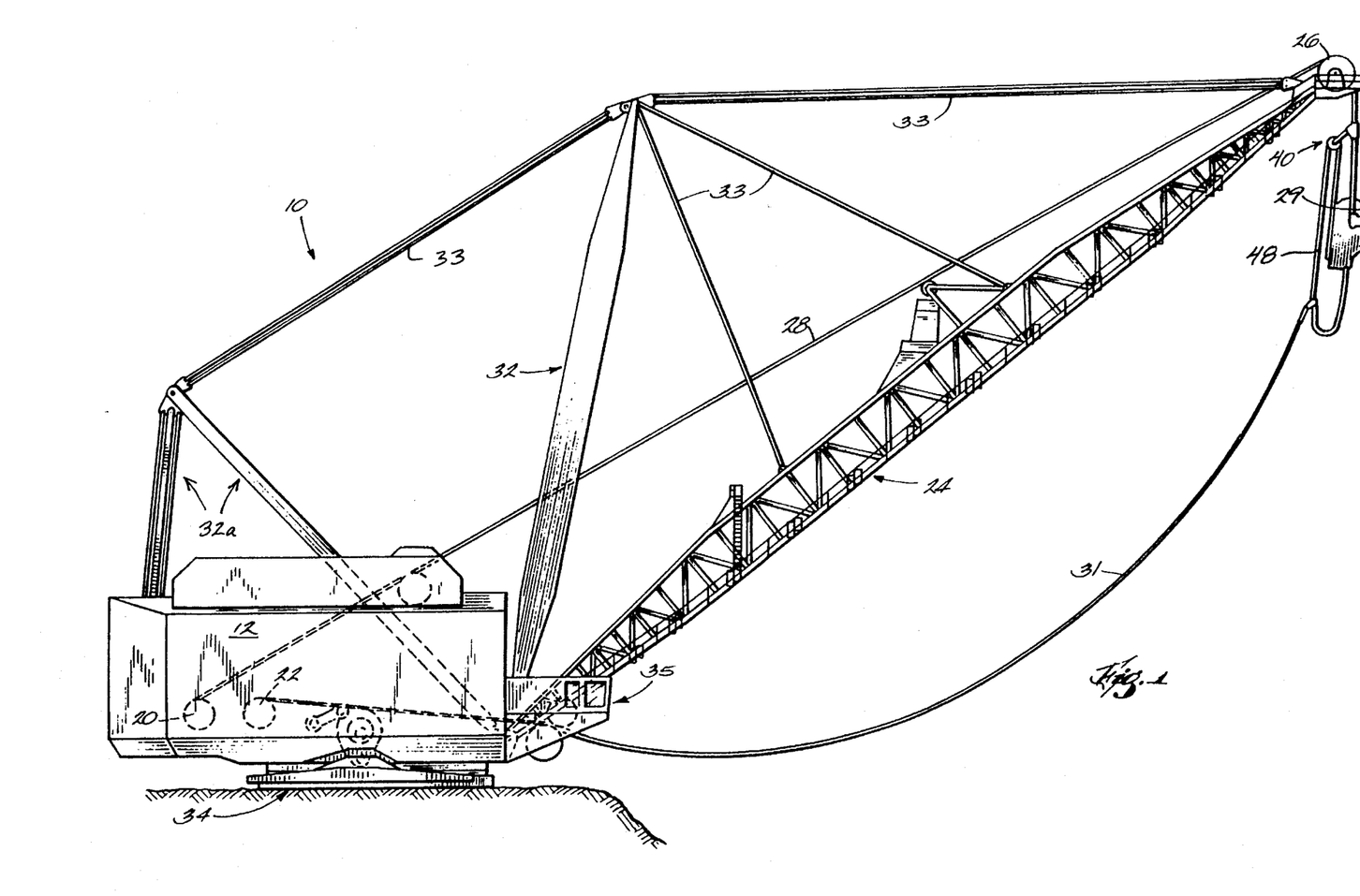
FIG. 1 is a side elevational view of a dragline embodying the invention.

A walking dragline 10 embodying the invention is illustrated in the drawings. The dragline 10 comprises (see FIG. 1) a main housing 12. A bucket hoist mechanism 20 and a bucket drag mechanism 22 are mounted on the main housing 12. A boom 24 extends upwardly and outwardly from the main housing 12. The upper end of the boom 24 has thereon a sheave 26 which is rotatable about a horizontal axis. A hoist rope 28 extends from the bucket hoist mechanism 20 over the sheave 26 to a bucket 29 for causing vertical movement of the bucket 29 relative to the boom 24. The manner in which the hoist rope 28 is connected to the bucket 29 is described below. A drag rope 31 extends from the bucket drag mechanism 22 to the bucket 29 for causing horizontal movement of the bucket 29. The boom 24 is supported relative to the main housing 12 by a conventional mast assembly 32. Support lines 33 are connected between the upper end of the mast assembly 32 and the boom 24 for supporting the boom 24 relative to the mast assembly 28. When the dragline 10 is digging, the main housing 12 is supported by a tub 32 that sits on the ground. A pair of walking mechanisms 34 (one shown) move the main housing 12 over the ground between digging operations. The main housing 12 includes an operator's cab 35. The dragline 10 as thus far described is conventional.

Figure 2:
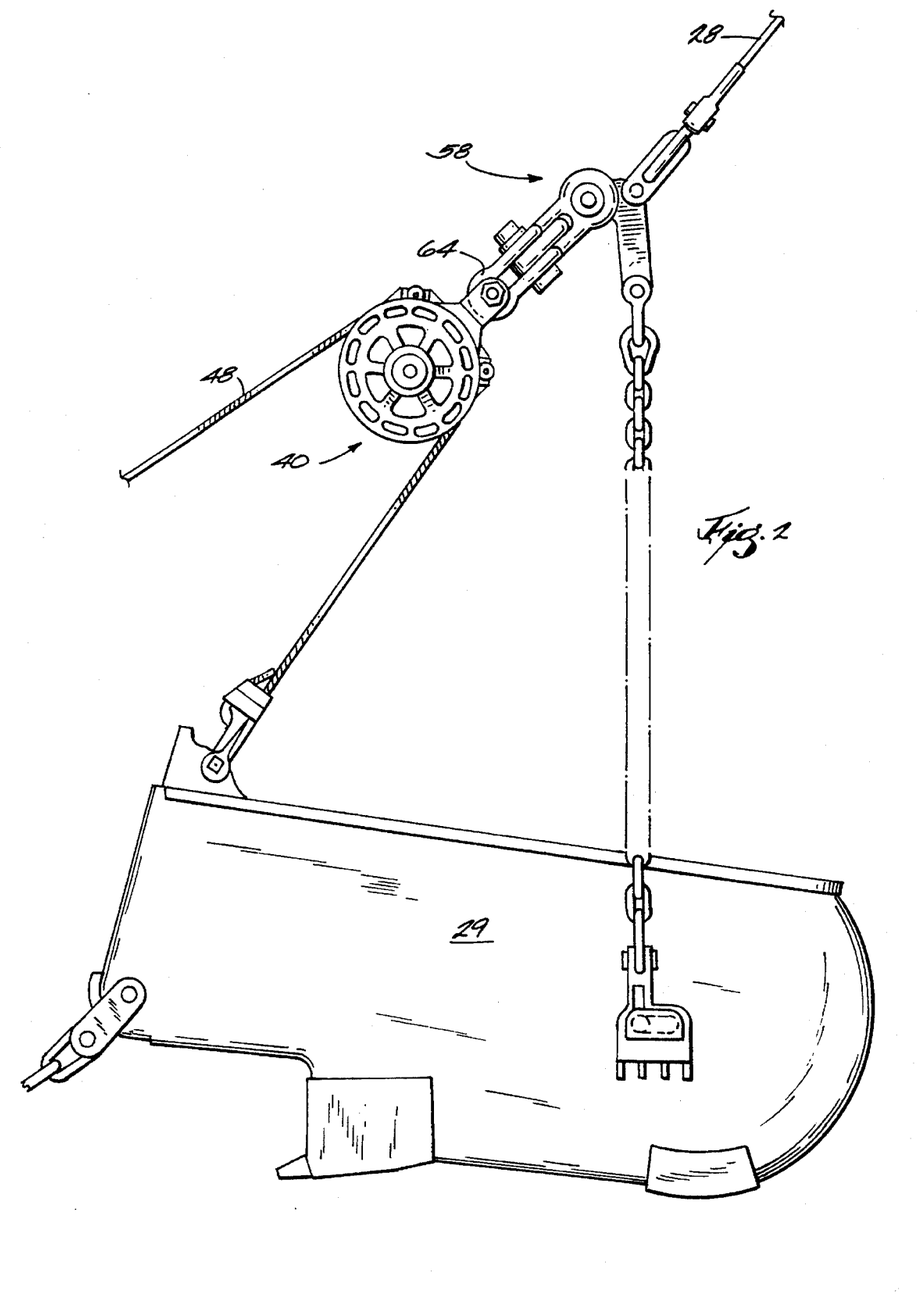
FIG. 2 is an enlarged elevational view of the bucket and a dump block.
Figure 3:
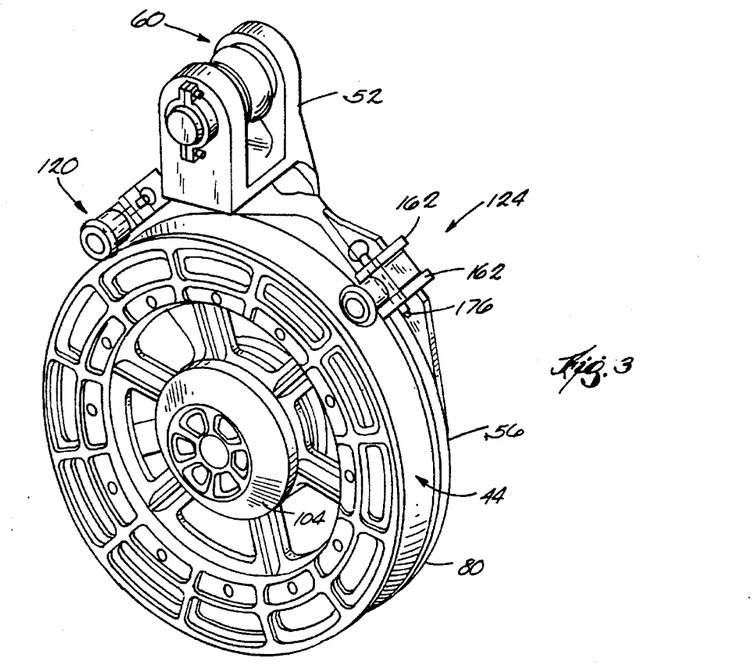
FIG. 3 is a perspective view of one side of the dump block.
Figure 4:
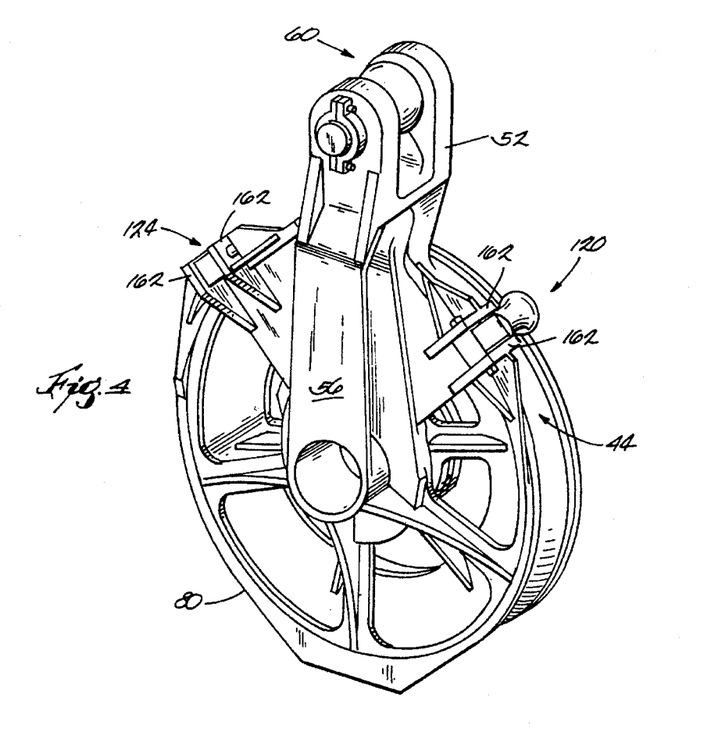
FIG. 4 is a perspective view of the other side of the dump block.
Figure 5:
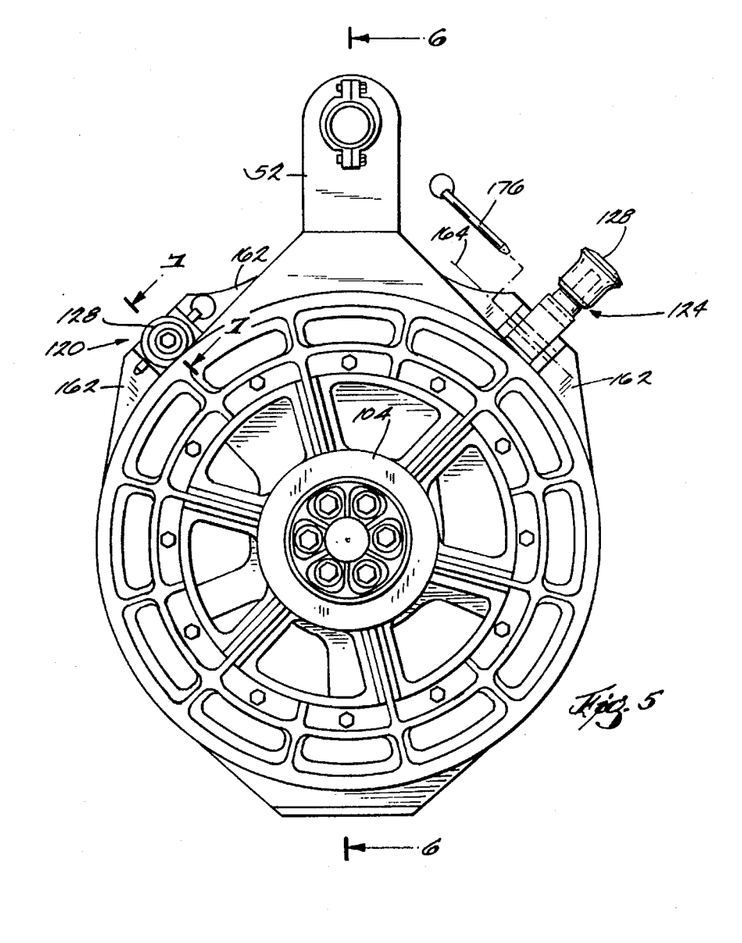
FIG. 5 is an elevational view of the side of the dump block shown in FIG. 3.

As best shown in FIG. 2, the end of the hoist rope 28 is connected to a pair of dump blocks 40 (only one is shown). The dump blocks 40 are substantially identical, and only one will be described in detail. The dump block 40 includes a sheave 44 (see FIGS. 3, 4 and 6), and a dump rope 48 (see FIGS. 2 and 7) extends over the sheave 44 and has one end connected to the drag rope 31 and an opposite end connected to the bucket 29.

The dump block 40 is illustrated in greater detail in FIGS. 3–9. The dump block 40 includes a frame 52 having a main portion 56 connected to the dump rope 48 by upper rigging 58 (see FIG. 2). The upper end of the frame main portion 56 has thereon a roller 60 (see FIGS. 3, 4 and 6), and the upper rigging 58 includes (see FIG. 2) a clevis 64 connected to the roller 60 such that the frame main portion 56 can pivot relative to the upper righting 58 about the axis of the roller 60. The frame 52 also includes (see FIG. 6) a cantilevered spindle 68 extending from the frame main portion 56 (to the left in FIG. 6). The spindle 68 has (see FIG. 8) a cylindrical outer surface 72 and has therethrough (see FIG. 6) an internal passageway 76. The frame 52 also includes an integral sheave guard 80 for protecting one side (the right side in FIG. 6) of the dump block sheave 44, which is mounted on the spindle 68 for rotation relative thereto about a sheave axis 84 concentric with the spindle outer surface 72. The sheave 44 is supported relative to the spindle 68 by a bearing assembly 88 (see FIGS. 6 and 8) which is described below in detail. The bearing assembly 88 is lubricated through one or more lubricant injectors 92 (see FIG. 6) accessible through the internal passageway 76.

Figure 6:
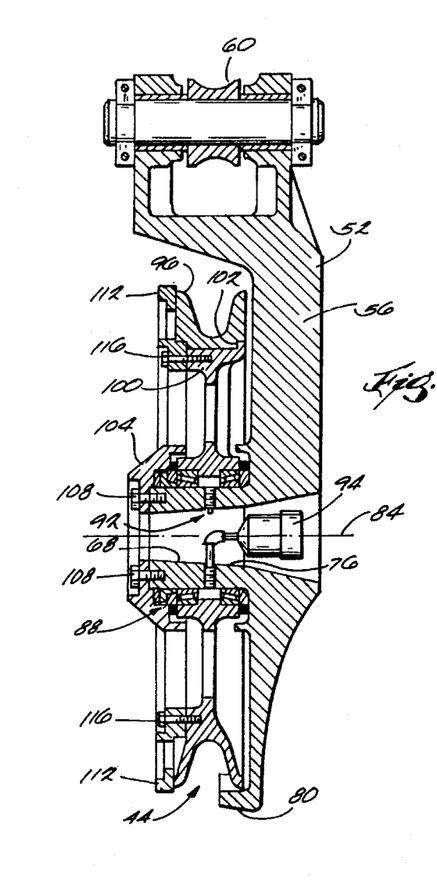
FIG. 6 is a view taken along line 6—6 in FIG. 5.

Two sheave constructions are illustrated in FIG. 6. As shown below the spindle 68, the sheave 44 is one piece and is made of steel. As shown above the spindle 68, the sheave 44 includes an annular nylon sheave 96 mounted on an annular steel sheave support 100, which is supported on the spindle 68 by the bearing assembly 88. The sheave support 100 has a radially extending shoulder 102 (see FIG. 6).

The dump block 40 also includes an end cap 104 secured to the outer end of the spindle 68 by suitable means such as bolts 108. The end cap 104 holds the sheave 44 and the bearing assembly 88 on the spindle 68 and also provides adjustment and protection for the bearing assembly 88, as described below. A sheave guard 112 is secured to the outside of either the sheave 44 or the sheave support 100 by suitable means such as bolts 116. When used with the nylon sheave 96, the sheave guard 112 clamps the nylon sheave 96 in place relative to the sheave support 100. Specifically, the sheave guard 112 presses the nylon sheave 96 axially against the shoulder 102 on the sheave support 100. The sheave guard 112 rotates with the sheave 44 and protects the outside of the sheave 44 (the left side in FIG. 6). Alternatively, the sheave guard 112 could be integral with the end cap 104, in which case the sheave 44 guard would not rotate with the sheave 44.

The dump block 40 also includes (see FIGS. 3–5 and 7) retaining assemblies 120 and 224 for substantially preventing the dump rope 48 from coming out of the sheave 44. The retaining assemblies 120 and 124 are substantially identical, and only the assembly 124 will be described in detail. The retaining assembly 124 includes (see FIG. 7) a roller 128 mounted on a roller support 132 for rotation about a roller axis 136 which moves with the roller support 132. The roller support 132 includes a generally rectangular block portion 140 and a spindle portion 144 extending from the block portion 140. The roller 128 is rotatably mounted on the spindle portion 144 and is held in place by a bolt 148 and a washer 152. The block portion 140 has therethrough first and second or right and left apertures 156 and 160, respectively. A pin 161 extends through ears 162 (see FIGS. 3–5) on the frame main portion 56 and through the right aperture 156 such that the roller support 132 can pivot relative to the frame 52 about a support axis 164 (see FIGS. 5 and 7) which is transverse to the sheave axis 84. The roller support 132 is pivotable relative to the frame 52 between a retaining position (shown in solid lines in FIG. 7) and a release position (shown in phantom in FIG. 7). When the roller support 132 is in the retaining position, the roller axis 136 is parallel to the sheave axis 84 and the roller 128 extends over the sheave 44 to retain the dump rope 48 on the sheave 44. The outer end of the roller 128 has thereon (see FIG. 7) a flange 168 for substantially preventing the dump rope 48 from becoming wedged between the roller 128 and the sheave 44. When the roller support 132 is in the release position, the roller 128 permits removal of the dump rode 48 from the sheave 44.

Means are provided for releaseably securing the roller support 132 in the retaining position. While various suitable means can be employed, in the illustrated construction, the frame ears 162 have therein apertures (not shown) which are aligned with the left aperture 160 in the roller support 132 when the roller support 132 is in its retaining position, and a pin 176 (see FIGS. 3, 5 and 7) is removably inserted into the apertures in the ears 162 and the apertures 160 to releaseably secure the roller support 132 in its retaining position.

The dump rope 48 can be easily removed from the dump block 40 by simply moving the rollers 128 to their release positions and removing the rope 48 from the sheave 44 in the direction away from the frame main portion 56. The pins 176 can be removed manually. No tools are required. This is much easier and less time consuming than with known prior arrangements.

It should be understood that other roller arrangements could be used to prevent the rode 48 from coming out of the sheave 44. For example, the rollers could pivot about an axis extending radially of the sheave 44, and other means could be used to releaseably secure the rollers.

The bearing assembly 88 will now be described in detail. The spindle 68 can be considered an inner member having an axis 84, an axially extending outer surface 72, and a radially extending surface 180 (see FIG. 8) perpendicular to the outer surface 72. The sheave 44 can be considered an outer member rotatable about the axis 84 relative to the inner member or spindle 68. The outer member or sheave 44 has an axially extending inner surface 184 including a first or inner shoulder 188 facing inwardly or toward the surface 180 (to the right in FIG. 8) and a second or outer shoulder 192 facing outwardly or away from the surface 180 (to the left in FIG. 8).

The bearing assembly 88 includes (see FIG. 8) axially inner and outer bearings 196 and 200, respectively, which are preferably tapered roller bearings. Each of the bearings 196 and 200 includes an inner race 204 abutting the spindle outer surface 72, an outer race 208 abutting the sheave inner surface 184, and a plurality of rollers 212 between the inner and outer races. The inner race 204 of the bearing 200 has a radially extending bearing surface 214. This construction is conventional and will not be described in greater detail. The inner bearing 196 is captured between the sheave inner shoulder 188 and the spindle surface 180. A spacer 216 is preferably located between the inner bearing 196 and the spindle surface 180, and a seal 220 surrounds the spacer 216 between the sheave 44 and the spindle surface 180. The outer bearing 200 is captured between a bearing retainer assembly 224 and the sheave outer shoulder 192.

The bearing retainer assembly 224 includes a first or radially outer ring or retainer 228 engaging the surface 214 of the outer bearing 200 such that the outer bearing 200 is captured between the ring 228 and the outer shoulder 192. The ring 228 also has an annular tapered surface 232 which faces radially inwardly and which tapers radially away from the spindle 68 and axially away from the outer bearing 200 (to the left in FIG. 8).

Figure 8:
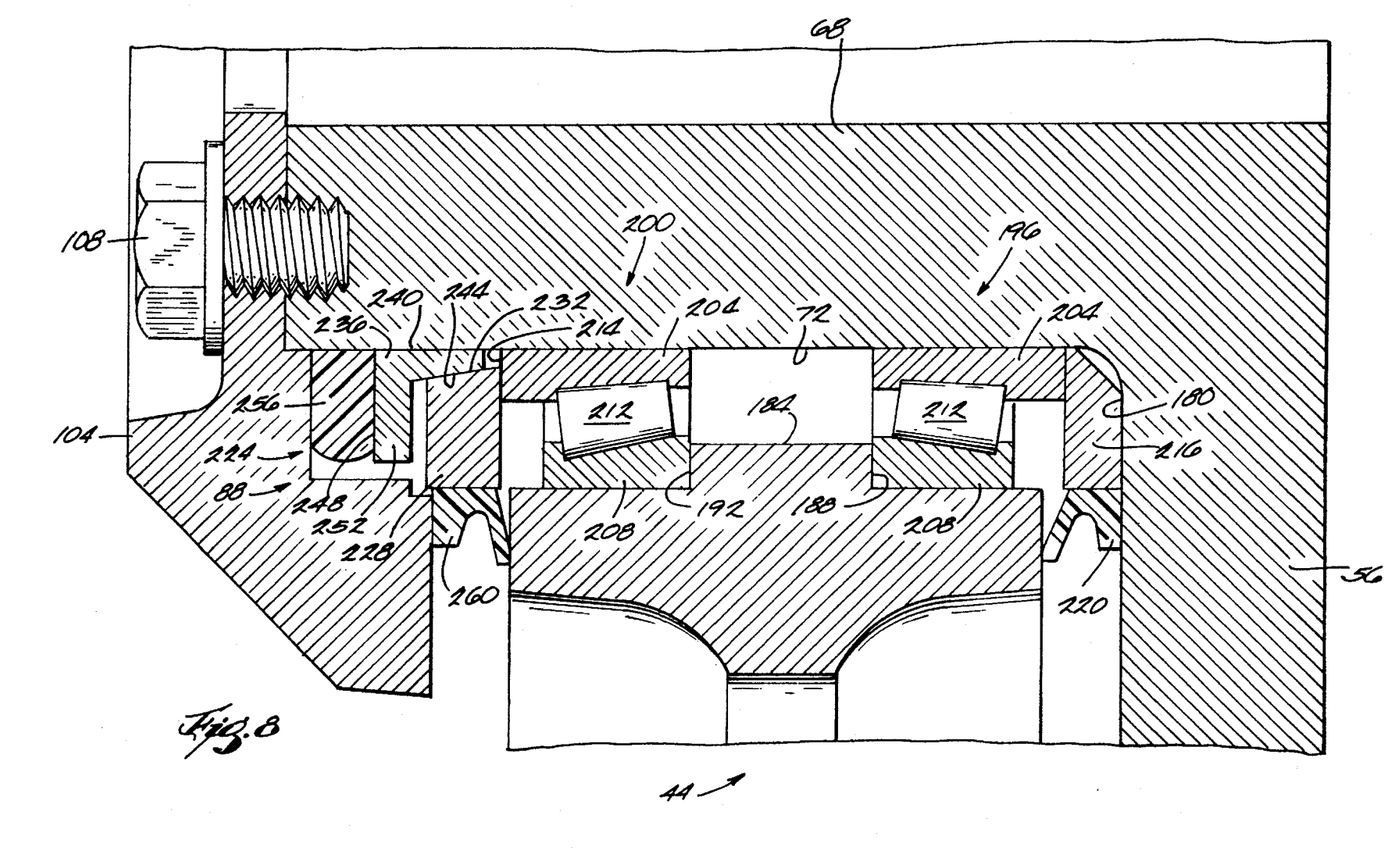
FIG. 8 is an enlarged portion of FIG. 6, with the sheave and frame partially shown.
Figure 9:
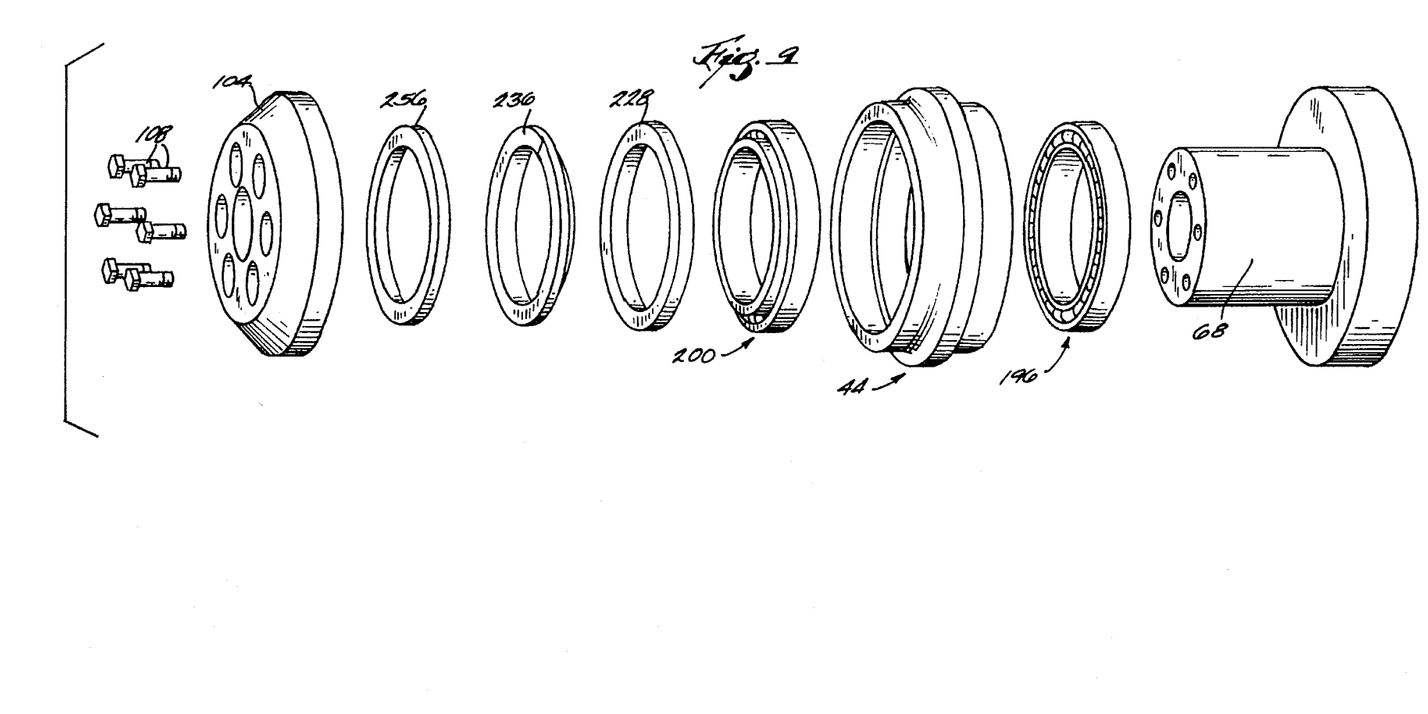
FIG. 9 is an exploded perspective view of the components shown in FIG. 8.

The bearing retainer assembly 224 also includes a second or radially inner ring or retainer 236 having an axially extending inner surface 240 engaging the spindle outer surface 72. The ring 236 is split so as to have a variable diameter, whereby the ring 236 can conform to the spindle outer surface 72. The inner ring 236 also has a tapered surface 244 complementary with and engaging the tapered surface 232 of the outer ring 228. Thus, the tapered surface 244 of the inner ring 236 faces radially outwardly and tapers radially away from the spindle 68 and axially away from the outer bearing 200. The inner ring 236 also has a radially extending end surface 248 facing away from the outer bearing 200 (to the left in FIG. 8). As shown in FIG. 8, the ring 236 is preferably generally L-shaped in cross-section with a radially outwardly extending flange 252 overlapping the outer ring 228.

An annular spring 256 engages the end surface 248 of the inner ring 236. While the preferred spring 256 is a polyurethane spring washer, it should be understood that other suitable springs, such as a conical disk or a wave-type washer, could be employed. The end cap 104 engages the spring 256 so that the spring 256 is compressed between the end cap 104 and the inner ring 236 and exerts a force on the inner ring 236 whereby the inner ring 236 is wedged between the outer ring 228 and the spindle outer surface 72 due to engagement of the tapered surfaces 232 and 244. This effectively locks the rings 228 and 236 in position. The angle of the taper is calculated such that frictional forces between the spindle 68 and the inner ring 236 are greater than the axial separating force of the bearings. The spring 256 provides a predetermined preload on the bearings. It is not necessary to tighten the bolts 108 to a particular torque. This makes it much easier than with known arrangements to properly preload the bearings.

A seal 260 surrounds the outer ring 228 between the end cap 104 and the sheave 44. As shown in FIG. 8, the end cap 104 axially overlaps the outer ring 228 so as to limit radially outward movement of the outer ring 228 relative to the spindle 68. In other words, the end cap 104 keeps the bearing assembly 88 from fully separating in the event the outer ring 228 slips or breaks.

Figures 1, 11:
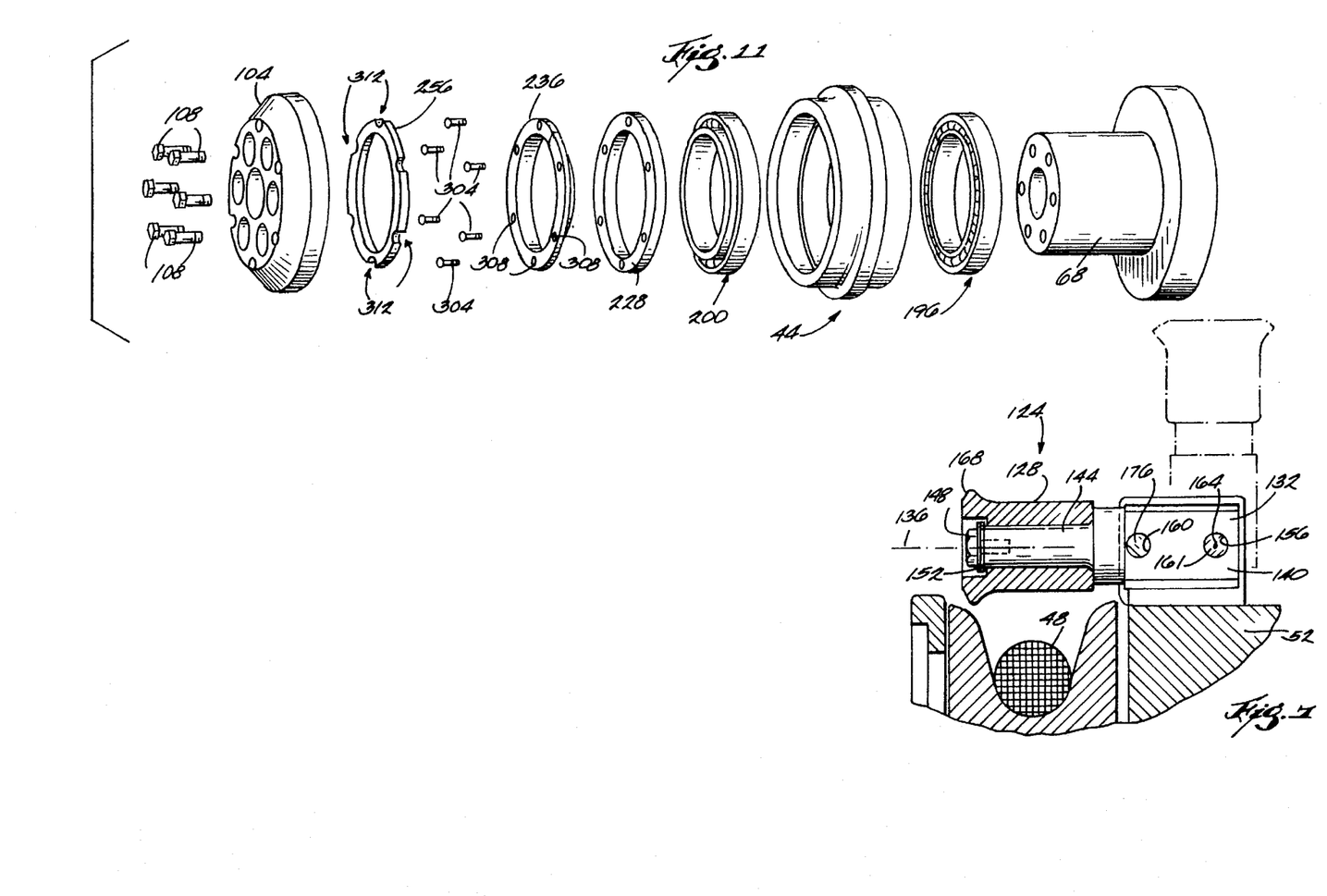
FIG. 11 is an exploded perspective view of the components shown in FIG. 10.
Figure 10:
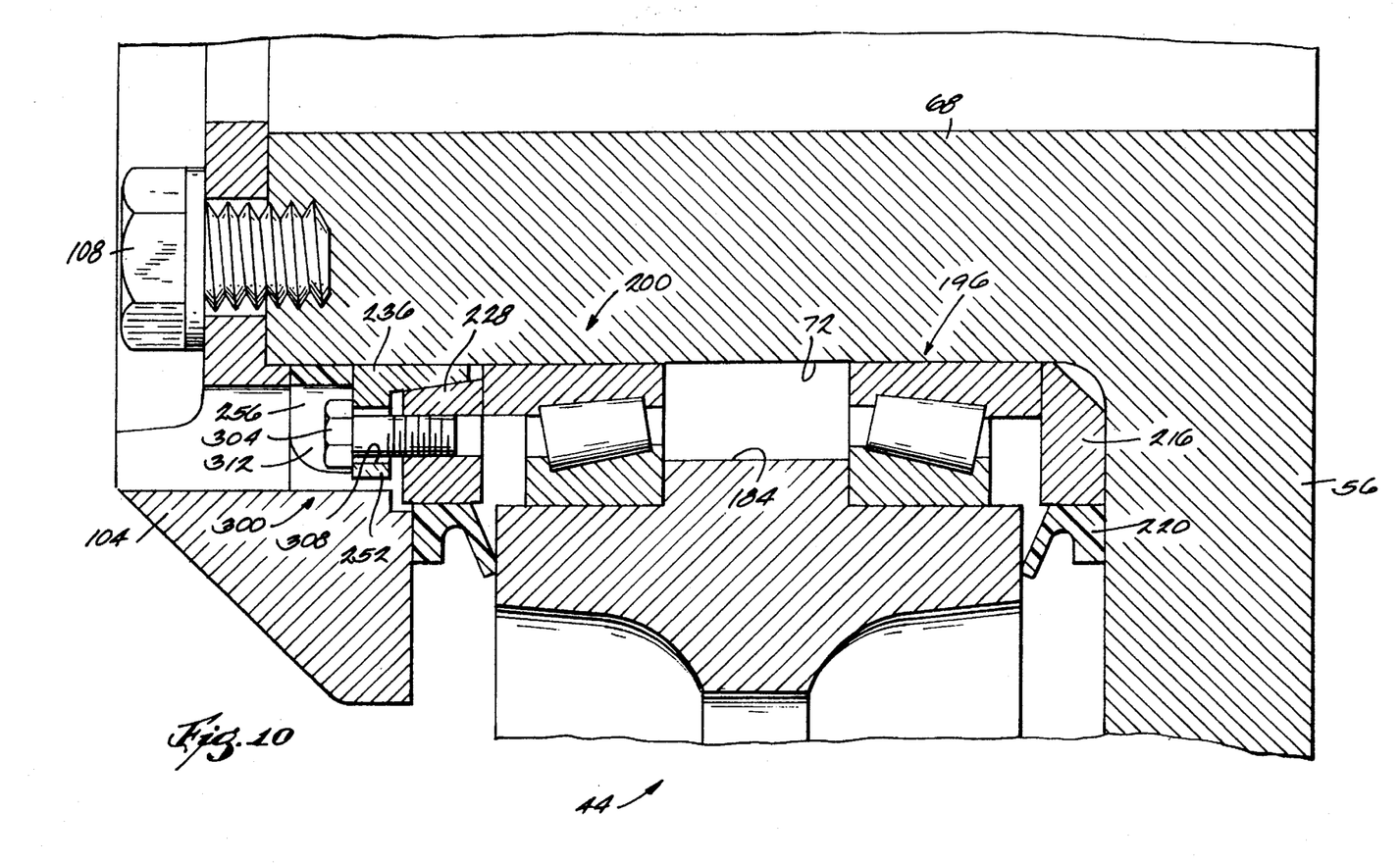
FIG. 10 is a view similar to FIG. 8 of an alternative bearing arrangement.

An alternative bearing retainer assembly 300 is illustrated in FIGS. 10 and 11. Except as described below, the bearing retainer assembly 300 is identical to the bearing retainer assembly 224, and common elements have been given the same reference numerals. The bearing retainer assembly 300 includes means for axially clamping the rings 228 and 236. While various suitable means can be employed, in the illustrated construction, such means includes a plurality of bolts 304 clampingly engaging the rings 228 and 236. More particularly, each bolt 304 extends through an aperture 308 in the inner ring flange 252 and is threaded into the outer ring 228. The apertures 308 in the inner ring 236 are large enough to allow some radial movement of the bolts 304 relative to the inner ring 236. The spring 256 has therein notches or cut-outs 312, each of which receives the head of a respective bolt 304 so that the bolt heads do not interfere with the spring 256. The bolts 304 can be used either to hold the rings 228 and 236 in place and keep them from sliding relative to the spindle 68, or to provide a gap for the bearings. In the latter case, the spring 256 applies a pre-load to the bearings, and the bolts 304 are used to draw the outer ring 228 back up onto the inner ring 236 to provide the gap. It should be understood that this retainer assembly 300 can also be used with cylindrical or non-tapered bearings to provide a desired gap.

Figure 12:
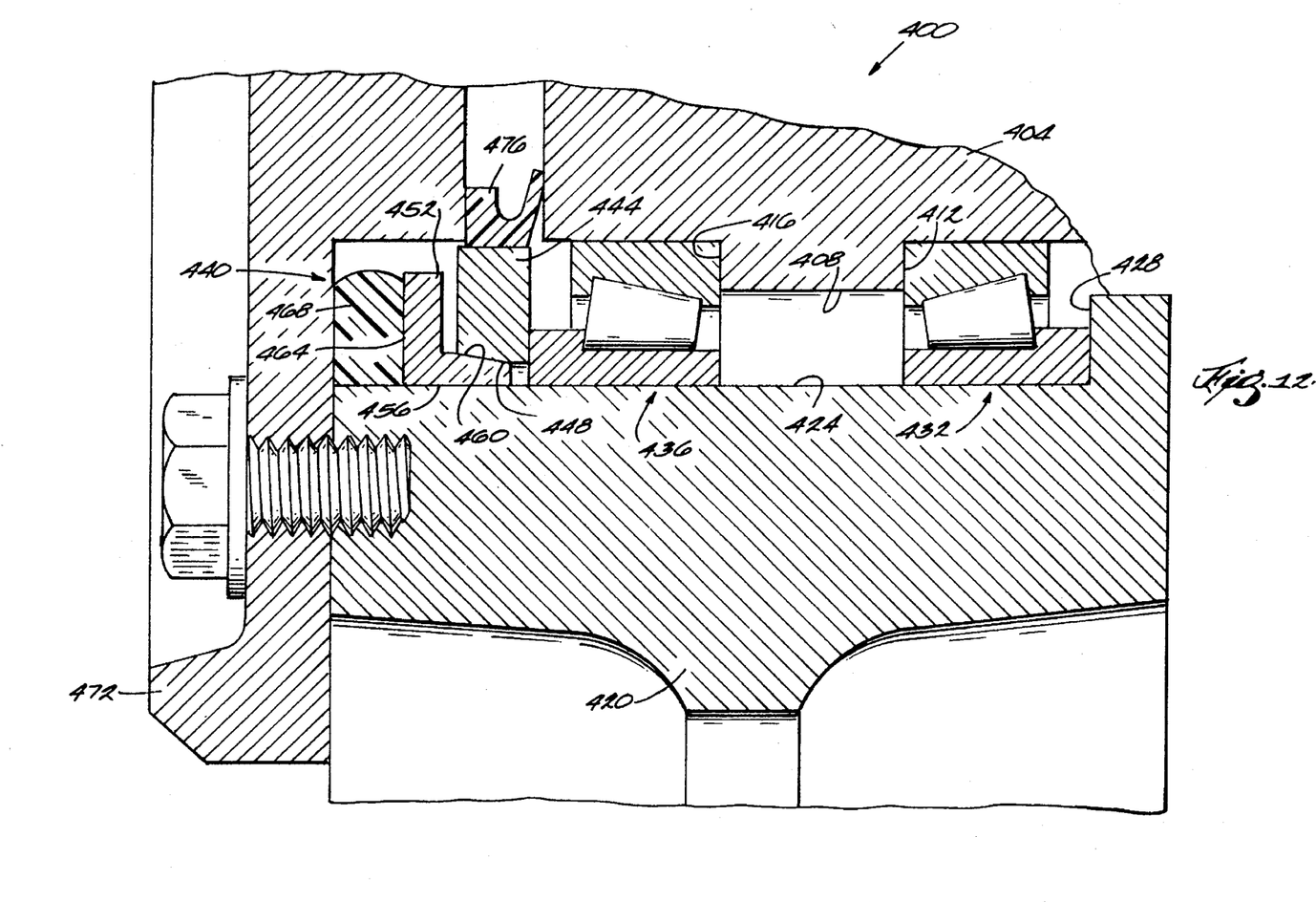
FIG. 12 is a view similar to FIG. 8 of another alternative bearing arrangement.

Another alternative bearing arrangement 400 is illustrated in FIG. 12. The bearing arrangement 400 includes an inner member or hub 404 (such as a spindle) with an outer surface 408 having opposed inner and outer shoulders 412 and 416, respectively. An outer member or hub 420 surrounds the inner hub 404 and has a cylindrical inner surface 424 and a radially inwardly extending surface 428. An inner bearing 432 is captured between the inner shoulder 412 and the surface 428. An outer bearing 436 is captured between the outer shoulder 416 and a bearing retainer assembly 440.

The assembly 440 includes a radially inner ring 444 engaging the outer bearing 436 such that the outer bearing 436 is captured between the ring 444 and the shoulder 416. The ring 444 also has an annular tapered surface 448 which faces radially outwardly and which tapers radially away from the outer hub 420 and axially away from the outer bearing 436 (to the left in FIG. 12). The bearing retainer assembly 440 also includes a radially outer ring 452 having an axially extending outer surface 456 engaging the inner surface 424 of the outer hub 420. The ring 452 is split so as to have a variable diameter, whereby the ring 452 can conform to the inner surface 424. The outer ring 452 also has a tapered surface 460 complementary with and engaging the tapered surface 448 of the inner ring 444. The outer ring 452 also has a radially extending end surface 464 facing away from the outer bearing 436 (to the left in FIG. 12). An annular spring 468 engages the end surface 464 of the outer ring 452. An end cap 472, which is fixed to the outer hub 420 for rotation therewith, engages the spring 468 so that the spring 468 is compressed between the end cap 472 and the outer ring 452 and exerts a force on the outer ring 452 whereby the outer ring 452 is wedged between the inner ring 444 and the inner surface 424 of the outer hub 420. A seal 476 is located inside the inner ring 444 between the end cap 472 and the inner hub 404.

Various features of the invention are set forth in the following claims.

I claim:

1. Apparatus comprising an inner member having an axis and an axially extending outer surface, an outer member having an axially extending inner surface, said inner and outer members being rotatable relative to each other about said axis, a bearing between said inner and outer surfaces, said bearing having a radially extending bearing surface, and a bearing retainer assembly including a first retainer which engages said bearing surface and which has a first tapered surface, a second retainer having a second tapered surface engaging said first tapered surface, an axially extending retainer surface engaging one of said inner and outer members, and a radially extending retainer surface, each of said first and second tapered surfaces tapering radially away from said one of said inner and outer members and axially away from said bearing, a spring engaging said retainer surface, and a cap which is fixed to said one of said inner and outer members and which engages said spring so that said spring is compressed between said cap and said retainer surface and exerts a force on said retainer surface whereby said second retainer is wedged between said first retainer and said one of said inner and outer members.

2. Apparatus as set forth in claim 1 wherein said retainers and said spring surround said inner member, and wherein said second retainer is split so as to have a variable diameter.

3. Apparatus as set forth in claim 2 wherein said inner and outer surfaces are cylindrical, wherein said retainers are rings, and wherein said spring is annular.

4. Apparatus as set forth in claim 1 wherein said axially extending retainer surface engages said outer surface of said inner member, wherein said first tapered surface faces radially inwardly, wherein said second tapered surface faces radially outwardly, and wherein each of said first and second tapered surfaces tapers radially away from said inner member and axially away from said bearing.

5. Apparatus as set forth in claim 1 wherein said one of said inner and outer members has a radially extending member surface, and wherein said bearing is captured between said radially extending member surface and said first retainer.

6. Apparatus as set forth in claim 5 wherein the other of said inner and outer members has a first shoulder facing said radially extending member surface, and a second shoulder facing away from said first shoulder, wherein said apparatus further comprises a second bearing captured between said first shoulder and said radially extending member surface, and wherein said first-mentioned bearing is captured between said first retainer and said second shoulder.

7. Apparatus as set forth in claim 6 wherein said bearings are tapered roller bearings.

8. Apparatus as set forth in claim 1 wherein said spring is made of polyurethane.

9. Apparatus as set forth in claim 1 wherein said bearing is a tapered roller bearing.

10. Apparatus as set forth in claim 1 wherein said retainer assembly also includes means for axially clamping said retainers.

11. Apparatus as set forth in claim 10 wherein said means includes a plurality of threaded fasteners clampingly engaging said retainers.

12. Apparatus comprising an inner member having an axis, an axially extending outer surface, and a radially outwardly extending member surface, an outer member having an axially extending inner surface, said inner and outer members being rotatable relative to each other about said axis, a tapered roller bearing between said inner and outer surfaces, said bearing having a radially extending bearing surface, and a bearing retainer assembly including an outer ring which engages said bearing surface so that said bearing is captured between said radially extending member surface and said outer ring, said outer ring having a first tapered surface facing radially inwardly, an inner, split ring having a second tapered surface which faces radially outwardly and which engages said first tapered surface, said split ring also having an axially extending ring surface engaging said outer surface of said inner member, and a radially extending ring surface, each of said first and second tapered surfaces tapering radially away from said inner member and axially away from said bearing, an annular spring engaging said ring surface, and a cap which is fixed to said inner member and which engages said spring so that said spring is compressed between said cap and said ring surface and forces said tapered surfaces against each other.

13. Apparatus as set forth in claim 12 wherein said outer member has a first shoulder facing said radially extending member surface, and a second shoulder facing away from said first shoulder, wherein said apparatus further comprises a second tapered roller bearing captured between said first shoulder and said radially extending member surface, and wherein said first-mentioned bearing is captured between said outer ring and said second shoulder.

14. Apparatus as set forth in claim 12 wherein said spring is made of polyurethane.

15. Apparatus as set forth in claim 12 wherein said retainer assembly also includes means for axially clamping said rings.

16. Apparatus as set forth in claim 15 wherein said means includes a plurality of threaded fasteners clampingly engaging said rings.

17. Apparatus as set forth in claim 12 wherein said end cap axially overlaps said outer ring so as to limit radially outward movement of said outer ring relative to said inner member.

18. Apparatus comprising an inner member having an axis and an axially extending outer surface, an outer member having an axially extending inner surface, said inner and outer members being rotatable relative to each other about said axis, a bearing between said inner and outer surfaces, said bearing having a radially extending bearing surface, and a bearing retainer assembly including a first ring which engages said bearing surface and which has a first tapered surface, a second, split ring having a second tapered surface engaging said first tapered surface, an axially extending ring surface engaging one of said inner and outer members, and a radially extending ring surface, means for axially clamping said rings, a spring engaging said ring surface, and a cap which is fixed to said one of said inner and outer members and which engages said spring so that said spring is compressed between said cap and said ring surface.

19. Apparatus as set forth in claim 18 wherein said means includes a plurality of threaded fasteners clampingly engaging said rings.

* * * * *

UNITED STATES PATENT AND TRADEMARK OFFICE
CERTIFICATE OF CORRECTION

PATENT NO. : 5,590,968
DATED : January 7, 1997
INVENTOR(S) : Andrew P. Dretzka

It is certified that error appears in the above—identified patent and that said Letters Patent is hereby corrected as shown below:

Column 3, line 46, delete "righting", insert --rigging--.

Column 4, line 19, delete "224", insert --124--.

Column 4, line 47, delete "rode", insert --rope--.

Column 4, line 67, delete "rode", insert --rope--.

Signed and Sealed this

First Day of April, 1997

Attest:

BRUCE LEHMAN

Attesting Officer     Commissioner of Patents and Trademarks